US012757094B2

(12) United States Patent
Hashmi et al.

(10) Patent No.: US 12,757,094 B2
(45) Date of Patent: Oct. 6, 2026

(54) FACILITATING DYNAMIC NETWORK TRAFFIC STEERING USING ARTIFICIAL INTELLIGENCE IN ADVANCED COMMUNICATION NETWORKS

(71) Applicant: Dell Products L.P., Round Rock, TX (US)

(72) Inventors: Umair Sajid Hashmi, Mississauga (CA); Marwan Mansour, Alexandria (EG); Jeebak Mitra, Ottawa (CA); Gwenael Poitau, Montreal (CA); Zeyad Abdelrahim, El-Qalubia (EG); Mohamed Abouzeid, El sheikh Zayed (EG)

(73) Assignee: DELL PRODUCTS L.P., Round Rock, TX (US)

( * ) Notice: Subject to any disclaimer, the term of this patent is extended or adjusted under 35 U.S.C. 154(b) by 276 days.

(21) Appl. No.: 18/625,420

(22) Filed: Apr. 3, 2024

(65) Prior Publication Data

US 2025/0317825 A1 Oct. 9, 2025

(51) Int. Cl.
*H04W 36/22* (2009.01)
*H04W 36/00* (2009.01)

(52) U.S. Cl.
CPC ....... *H04W 36/22* (2013.01); *H04W 36/0055* (2013.01)

(58) Field of Classification Search
None
See application file for complete search history.

(56) References Cited

U.S. PATENT DOCUMENTS 9,332,471 B2 * 5/2016 Huang .............. H04W 36/0085
10,841,853 B1 * 11/2020 Yousefi'zadeh ...... H04W 36/22
12,213,005 B2 * 1/2025 Bedekar .............. H04W 28/086
(Continued)

OTHER PUBLICATIONS

Ivanov et al., "Boost Then Convolve: Gradient Boosting Meets Graph Neural Networks" arXiv:2101.08543v2 [cs.LG] Mar. 31, 2021 (16 pages).
(Continued)

*Primary Examiner* — Brian S Roberts
(74) *Attorney, Agent, or Firm* — Amin, Turocy & Watson, LLP

(57) ABSTRACT

Facilitating dynamic network traffic steering using artificial intelligence in advanced communication networks is provided. A method includes determining respective results of application of a utility function to respective combinations of potential handovers of a specified user equipment from a source cell to respective target cells of a group of target cells. The method also includes, based on the respective results of the application of the utility function, determining that a first combination of the respective combinations increases a value of the utility function as compared to other combinations of the respective combinations, other than the first combination. Further, the method includes, during a defined interval associated with a traffic steering process, facilitating the handover of the specified user equipment from the source cell to the first target cell. Other user equipment other than the specified user equipment within the communication network are not handed over during the defined interval.

20 Claims, 13 Drawing Sheets

(56) References Cited

U.S. PATENT DOCUMENTS

| | | | | |
|---|---|---|---|---|
| 2008/0031368 | A1* | 2/2008 | Lindoff | H04W 48/20 455/450 |
| 2023/0059448 | A1* | 2/2023 | Mattam | H04W 74/0841 |
| 2024/0205781 | A1* | 6/2024 | Li | H04W 36/32 |

OTHER PUBLICATIONS

Chatzistefanidis et al., "ML-based Traffic Steering for Heterogeneous Ultra-dense beyond-5G Networks" 2023 IEEE Wireless Communications and Networking Conference (WCNC) | 978-1-6654-9122-8/23/$31.00 @2023 IEEE | DOI: 10.1109/WCNC55385.2023.10118923 (6 pages).

* cited by examiner

200

$$\min\,(Power_{ratio})^{\alpha}(QoSDegradation_{ratio})^{\beta}(UEHO_{ratio})^{\gamma}$$

FIG. 2

900

$$R^t = \begin{cases} 1 - e^{\zeta(u^t - 1)};\ \text{for valid action} \\ Z;\ \text{for invalid action} \end{cases} ;\zeta > 1\ , Z \in [-1,0]$$

where $u^t = (Power_{ratio})^{\alpha}(QoSDegradation_{ratio})^{\beta}(UEHO_{ratio})^{\gamma}$

FIG. 9

FACILITATING DYNAMIC NETWORK TRAFFIC STEERING USING ARTIFICIAL INTELLIGENCE IN ADVANCED COMMUNICATION NETWORKS

BACKGROUND

The use of computing devices is ubiquitous. Given the explosive demand placed upon mobility networks and the advent of advanced use cases (e.g., streaming, gaming, and so on), power consumption in such networks is higher as compared to Long Term Evolution (LTE) networks, for example. Such power consumption can be attributed to the exponential increase in the network traffic flowing through the advanced network and the need for faster processing of complex tasks. Accordingly, unique challenges exist related to network efficiency and in view of forthcoming Fifth Generation (5G), new radio (NR), Sixth Generation (6G), or other next generation, standards for network communication.

The above-described context with respect to communication networks is merely intended to provide an overview of current technology and is not intended to be exhaustive. Other contextual descriptions, and corresponding benefits of some of the various non-limiting embodiments described herein, will become further apparent upon review of the following detailed description.

SUMMARY

The following presents a simplified summary of the disclosed subject matter to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An embodiment relates to a method that includes determining, by a system comprising at least one processor, respective results of application of a utility function to respective combinations of potential handovers of a specified user equipment from a source cell to respective target cells of a group of target cells. A communication network comprises the source cell and the group of target cells. The method also includes, based on the respective results of the application of the utility function, determining, by the system, that a first combination of the respective combinations increases a value of the utility function as compared to other combinations of the respective combinations, other than the first combination. The first combination identifies a handover of the potential handovers of the specified user equipment from the source cell to a first target cell of the group of target cells. Further, the method includes, during a defined interval associated with a traffic steering process, facilitating, by the system, the handover of the specified user equipment from the source cell to the first target cell. Other user equipment other than the specified user equipment within the communication network are not handed over during the defined interval.

According to some implementations, determining of the respective results of the application of the utility function can include determining a first result of application of the utility function to the specified user equipment and the first target cell. The first result comprises a first increase to the utility function. Determining the respective results can also include determining a second result of application of the utility function to the specified user equipment and a second target cell of the group of target cells. The second result includes a second increase to the utility function. Further, determining the respective results can include, based on the first increase being determined to be a larger increase than the second increase, selecting the first target cell as the first target cell.

In some implementations, the method can include, prior to determining of the respective results of the application of the utility function and based on a graph attention network process, training, by the system, a first model to a first defined confidence level. The method can also include, based on a deep reinforcement learning process, training, by the system, a second model to a second defined confidence level. Further to these implementations, training the second model can include, sending, by the system, information indicative of a change value to the utility function in case of a user equipment handover from a source to target cell pair. In addition, the method can include applying, by the system, a reward to the second model based on a reward function.

Further to the above implementations, applying the reward can include, based on a first determination that the handover resulted in a positive change to the utility function, applying a positive reward to the second model. Alternatively, based on a second determination that the handover resulted in a negative change to the utility function, applying a penalty to the second model.

The utility function is based on an optimization function that facilitates a tradeoff between user equipment quality of service, an energy consumption of the communication network, and an amount of handovers for the specified user equipment during a defined time period. For example, the user equipment quality of service is defined for respective user equipment classes of user equipment within the communication network.

Determining of the respective results of the application of the utility function, in some implementations, can be based on a recurrent neural network based graph neural network model and determining that the first combination of the respective combinations increases the value of the utility function is based on a reinforcement learning model. Further to these implementation, the recurrent neural network based graph neural network model employs a graph neural network model, and the reinforcement learning model employs a deep reinforcement learning model. For example, the recurrent neural network based graph neural network model and the reinforcement learning model are implemented as respective network automation tools.

In some implementations, the communication network is deployed as a disaggregated architecture that comprises central units, distributed units, and a near-real-time-radio access network intelligent controller. According to some implementations, the group of target cells is configured to operate according to a new radio network communication protocol, a 5G network communication protocol, beyond 5G network communication protocol, and/or another advanced network communication protocol.

Another embodiment relates to a system that includes a processor and a memory that stores executable instructions that, when executed by the processor, facilitate performance of operations. The operations can include, based on respective results of application of a utility function to respective combinations of potential handovers of a specified user equipment from a source cell to respective target cells of a group of target cells, determining that a first combination of the respective combinations results in an increase in the utility function as compared to other combinations of the respective combinations, other than the first combination. The first combination identifies a handover of the potential handovers of the specified user equipment from the source cell to a target cell of the group of target cells. The operations can also include, during a defined interval, causing the handover of the specified user equipment from the source cell to the target cell, wherein other user equipment are not handed over during the defined interval.

In some implementations, the operations can include, prior to determining of the respective results of the application of the utility function and based on a graph attention network process, training a first model to a first defined confidence level. The operations can also include, based on a deep reinforcement learning process, training a second model to a second defined confidence level. Further to these implementations, the first model is a graph neural network model, and the second model is a deep reinforcement learning model.

According to some implementations, the utility function is based on an optimization function that facilitates a tradeoff between user equipment quality of service, an energy consumption of a communication network, and a quantity of previous handovers of the specified user equipment during a defined time period. Further to these implementations, the user equipment quality of service is defined for respective user equipment classes of user equipment within the communication network.

Yet another embodiment relates to a non-transitory machine-readable medium, comprising executable instructions that, when executed by a processor of network equipment, facilitate performance of operations. The operations can include determining respective results of application of a utility function to respective combinations of potential transfers of a specified user equipment from being connect to a source cell to being connected to respective target cells of a group of target cells. A communication network comprises the source cell and the group of target cells. The operations can also include, based on the respective results of the application of the utility function, determining that a first combination of the respective combinations causes an increase to the utility function as compared to other combinations of the respective combinations, other than the first combination. The first combination identifies a transfer of the potential transfers of the specified user equipment from the source cell to a target cell of the group of target cells. Further, the operations can include, during a defined interval associated with a traffic steering process, implementing a network traffic steering process that transfers the specified user equipment from being connect to the source cell to being connected the target cell. Further, other user equipment other than the specified user equipment within the communication network are not moved between cells during the defined interval.

In some implementations, the utility function is based on an optimization function that facilitates a tradeoff between user equipment quality of service, an energy consumption of the communication network, and a number of transfers of the specified user equipment within a defined time period. Further, the user equipment quality of service is defined for respective user equipment classes of user equipment within the communication network.

To the accomplishment of the foregoing and related ends, the disclosed subject matter includes one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description can include additional or alternative embodiments beyond those described in this summary.

BRIEF DESCRIPTION OF THE DRAWINGS

Various non-limiting embodiments are further described with reference to the accompanying drawings in which:

FIG. 2 illustrates an example, non-limiting, equation for an optimization function according to one or more embodiments described herein;

FIG. 9 illustrates a mathematical representation of a reward function for time instance 't' in accordance with one or more embodiments described herein;

DETAILED DESCRIPTION

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details. In other instances, well-known structures and devices are shown in block diagram form in order to facilitate describing the various embodiments.

As wireless networks become denser and cater to diverse user equipment (UE) types and demands, optimal resource allocation of resources within the network becomes a challenge. In a network environment, there is need to switch the traffic across cells based on changes in radio environment, user mobility, and/or application requirements to satisfy performance requirements. This may also necessitate a traffic split across multiple tiers (e.g., macro, small cells).

Often times the allocation of the resources tends to become wasteful over the course of time if the allocation of resources are not updated optimally per the channel conditions. Accordingly, the network should transition to a more optimal state that better matches the current demand and traffic. This is referred to as traffic steering when it is performed for a group of cell sites that have adjacencies and/or dependencies.

The objective of traffic steering (TS) can include fairly (e.g., as evenly as possible) distributing the UE traffic load between cell sites (e.g., load balancing). This can ensure greater quality of service (QoS) for higher priority traffic classes and the like. In the TS process, first UEs from a congested and/or overloaded cell are identified for handover (HO) to a neighboring cell. Upon or after identification of the UEs, the HO is initiated to redirect their link with the new base station (BS), cell, and/or carrier.

The motivation behind TS within networks is that existing Radio Resource Management (RRM) features are cell-centric. For example, instead of treating UEs independently, the average cell-centric performance for network management is utilized. Due to variations in the network environment, neighbor cell coverage, interference patterns, and so on, the network performance may be improved by efficiently offloading UEs between cells, BSs, and/or carriers to optimize network-wide performance metrics.

Additionally, traffic management within existing networks is reactive in nature, and does not take advantage of predictive capabilities to predict network and UE performance. If UE traffic is not managed efficiently among a group of cells and/or BSs, the overall UE and network performance suffers. This can result in suboptimal spectrum utilization, reduced throughput, and increased handover failure.

Figure 1:
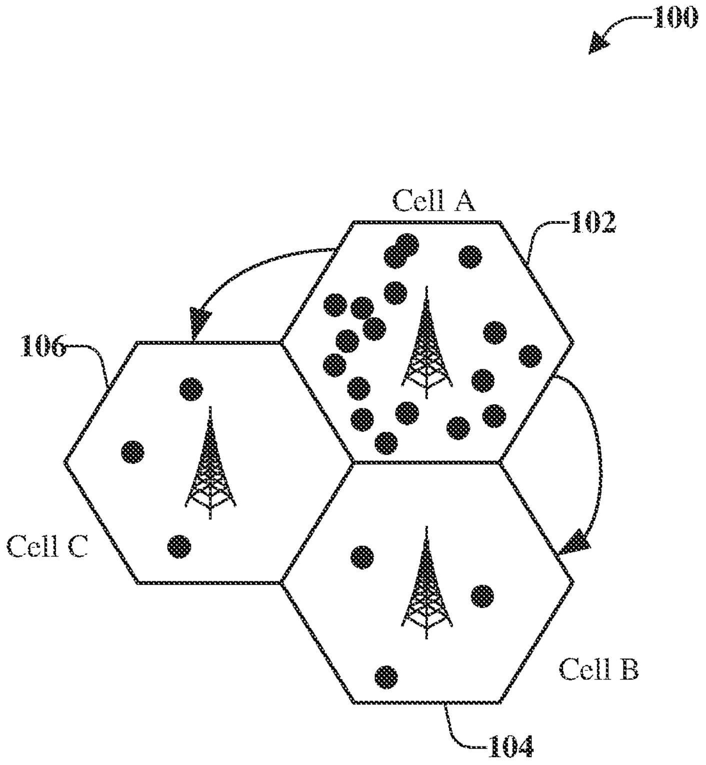
FIG. 1 illustrates an example, non-limiting, network environment that utilizes traffic steering in accordance with one or more embodiments described herein.

FIG. 1 illustrates an example, non-limiting, network environment 100 that utilizes traffic steering in accordance with one or more embodiments. The network environment 100 includes multiple cells, illustrated as Cell A 102, Cell B 104, and Cell C 106. Each cell includes one or more UEs, denoted by the circles within the cells. As illustrated, Cell A 102 is more heavily loaded with UEs as compared to Cell B 104 and Cell C 106. Therefore, UE traffic from heavily loaded Cell A 102 should be steered (e.g., handed off, communication links transferred) to lightly loaded Cell B 104 and/or Cell C 106.

With growth in traffic as well as diverse bands and radio access technologies (RATs), to maintain a balanced distribution of network traffic, the network traffic should be distributed and switched across multiple radios, access technologies, and/or carriers.

In addition, steering traffic across multiple base stations (BSs) and carriers within a single RAT can allow for improving user quality of satisfaction (QoS) and improve energy efficiency (EE) of the network. Some conventional TS processes have considered Radio Frequency (RF) condition variations due to user mobility, some have considered average cell-level UE throughput, while others have considered both key performance indicators (KPIs) simultaneously.

Instead of a load counter based (which could be based on number of connected UEs, cell load, and so on) or passive TS based on average cell-level KPIs, the disclosed embodiments utilize user equipment (UE)-centric TS, which focuses on UE-level performance metrics instead of average cell-based statistics. Further, as discussed herein, the TS decisions take multiple factors, such as neighboring cell coverage, signal strength, and/or interference status, into consideration. In addition, instead of performing TS on a per cell basis using isolated mechanisms such as anomaly detection based on user QoS KPIs, the TS decisions should be performed on a per cell cluster level to optimize cluster level UE KPIs, as provided herein.

It is noted that, for the avoidance of doubt, any embodiments described herein in the context of optimizing resource allocation, one or more states, spectrum utilization, and so on are not so limited and should be considered also to cover any techniques that implement underlying aspects or parts of the described aspects to improve or increase resource allocation, one or more states, spectrum utilization, and so on, even if resulting in a sub-optimal variant obtained by relaxing aspects or parts of a given implementation or embodiment.

Provided herein is a data-driven TS approach for a multicell network based on the maximization of a long-term utility function that achieves a tradeoff between user QoS, network energy consumption, and the cost of TS in terms of handover frequency of UEs. The tradeoff can be modelled based on the network operator-intent and can be utilized to prioritize a different KPI in a given spatio-temporal region. For example, a first decision can be based on the first location and a first time, a second decision can be based on the second location and a second time, and so on. Thus, the prioritization between QoS and network energy consumption can be different based on the time and place (and UE device classes) under consideration.

Also provided herein is a system architecture, method, and other embodiments that perform dynamic traffic steering for a cluster of cells. The dynamic traffic steering may be triggered after a preset time interval and/or through system defined thresholds such as cell load limit or QoS degradation metric for the UEs within the cluster. The framework takes into consideration the spatial adjacencies within the cluster with statistical indicators incorporated within a learning model.

The optimization problem can be formulated over a cluster of cells with an objective of optimizing the tradeoff between KPIs such as cluster wide EE, UE QoS, and so on, for a diverse class of UEs, while minimizing the number of handovers to avoid a ping pong effect (e.g., UEs being transferred often). The UE device class referred to herein is the QoS class of the requested traffic. At a very high level, this can simply be guaranteed bit rate (GBR) versus non-GBR traffic. A UE device class implies that devices (in the different classes) are requesting applications with different KPIs and target levels, so their satisfaction should be measured across the relevant KPIs. Examples include, but are not limited to, enhanced Mobile Broadband (eMBB), Ultra-reliable low-latency communications (URLLC), Massive Machine Type Communications (mMTC), and so on.

The disclosed embodiments include a control flow architecture in a disaggregated network architecture such as Open radio access network (O-RAN), to depict the interaction of the controller with E2 nodes and dynamic execution of the TS based on the model recommendations. However, it is noted that the O-RAN embodiment is merely an example and other types of disaggregated network architecture can be utilized.

Conventional methods for traffic steering are static and are based on thresholds on cell loads (e.g., number of users connected, PRB utilization) or user QoS level (e.g., mean cell throughput). Thus, traffic steering, in such conventional methods, is performed when a certain cell load has been reached, or a QoS or average service latency has increased beyond a certain point. However, such methods are reactive in nature and do not provide proactive traffic steering policies or use the knowledge of graphical interconnectivity to provide policies that will yield long term performance improvement without excessive handovers. Recent literature has proposed using Artificial Intelligence (AI) and/or Machine Learning (ML) techniques for dynamic handovers in heterogeneous networks. However, these methods lack utilization of the spatial dependencies within the network which, if used through graph neural networks, enhances the prediction performance of the designed processes, as discussed herein.

Provided herein is an optimization utility function that is based on a tradeoff between cluster EE, cluster-wide UE QoS degradation, and frequency of HOs averaged over UE population within the cluster. FIG. 2 illustrates an example, non-limiting, equation 200 for an optimization function in accordance with one or more embodiments. In the equation $Power_{ratio}$ is the average power consumed within a given decision interval to the max cluster power consumption. $QoSDegration_{ratio}$ is the percentage of UEs with QoS degradation in the considered time interval. $UEHO_{ratio}$ is the percentage of UEs that have been steered to another cell and/or BS and/or carrier via HO as part of the optimization process in the considered time interval. Further, parameters α, β, and γ are the network operator intent based tradeoff between EE, UE QoS, and TS HO costs, respectively. These parameters signify the operator-intent defined weightage of each of these quantities within the optimization paradigm. The parameters α, β, and γ are configurable and can change over time, place, and/or a current priority, all of which can change given various circumstances.

Figure 3:
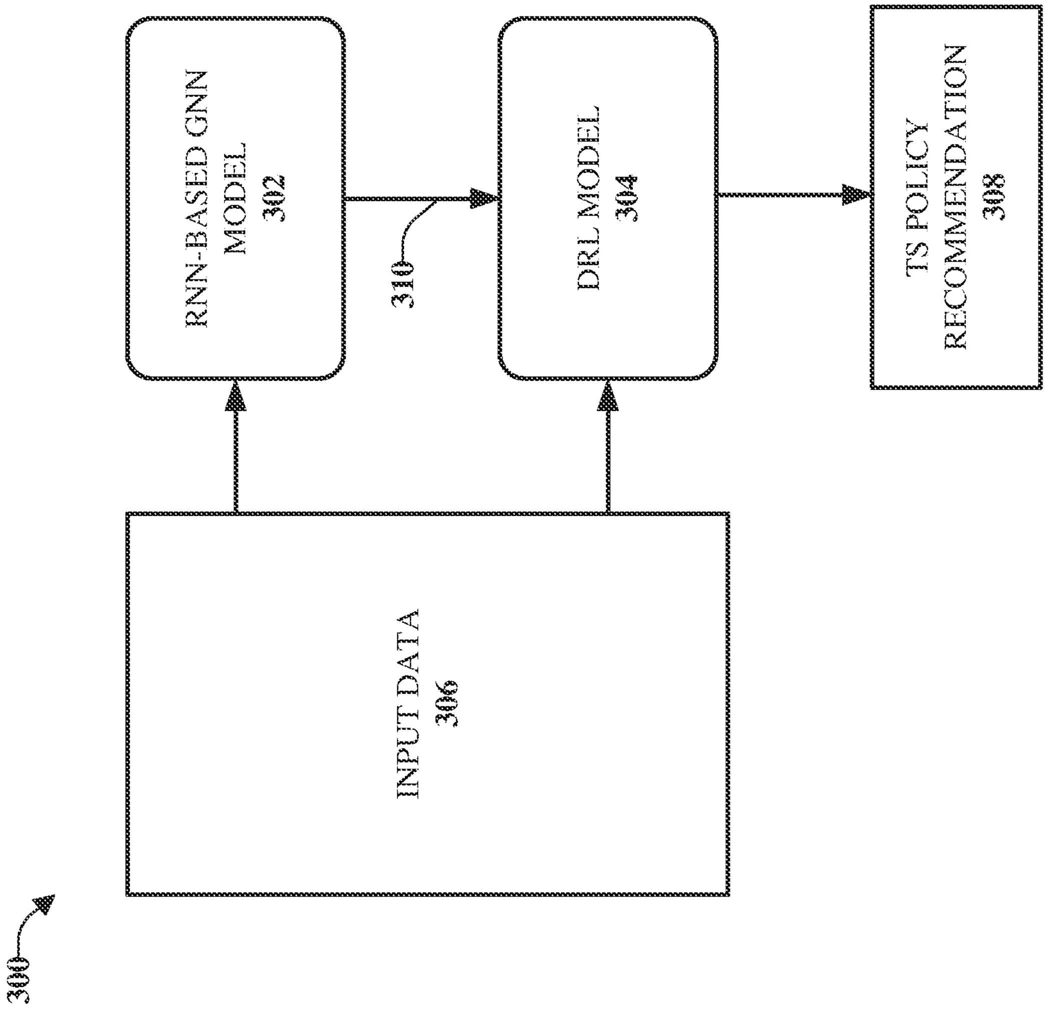
FIG. 3 illustrates an example, non-limiting, process flow that facilitates dynamic network traffic steering using artificial intelligence in accordance with one or more embodiments described herein.

FIG. 3 illustrates an example, non-limiting, process flow 300 that facilitates dynamic network traffic steering using artificial intelligence in accordance with one or more embodiments. The process flow includes GNN model 302, which is an RNN-based GNN model, and a DRL model 304. The GNN model 302 is utilized for feature extraction and future feature state prediction using network statistics. The DRL model 304 is utilized for pairwise TS action probability on improvement of the network utility function.

Input data 306 is provided to the GNN model 302 and the DRL model 304. The input data can include information indicative of one or more of the following: UE locations, BS locations, BS adjacency matrix, cell load statistics, UE KPI metrics, HO statistics, received signal power measures, CQI measurements, and so on. Output data from the DRL model 304 can include a TS policy recommendation 308. In an implementation, the TS policy recommendation 308 can be from an xApp, for example.

In further detail, the learning model used for the agent that optimizes the utility is a deep reinforcement learning (DRL) model based on recurrent neural networks (RNN) variant (LSTM) combined with graph neural network (GNN) (e.g., the GNN model 302). In this case, the RNN, aided with a memory repository, stores the temporal information about the network, and the GNN models the spatial knowledge and neighborhood adjacency of the network. The GNN model 302 is aided with a gated attention mechanism to capture the spatial dependencies within the network.

The DRL model 304 then uses the features captured from the GNN model 302 (as output from the GNN model 302, at 310), along with its predictions of features in future time steps to predict the probability of increase in the utility function if handover for each combination of nearby cells is performed. If the probability is determined to be at or above (or satisfy) a threshold, the handover is performed for a given maximum number of UEs within the cell that meet the received power criteria from the nearby cell. If the probability is determined to be below (fails to satisfy) the threshold, the handover is not performed.

As illustrated, the GNN model 302 captures the spatial layout of the network (input data 306), while the RNN uses its prediction capabilities on prior data to predict the future feature states of the network. The DRL agent (DRL model 304) uses the current and future feature predictions along with the network statistics as input data (e.g., the input data 306) and yields a probability on whether TS from cell A to cell B would lead to an improvement in the network utility function. This probability is calculated for all neighbor cell pairs, information of which is embedded in the graph structure of the network.

Finally, the TS policy recommendation 308 is finalized from the application based on whether the TS cell pair recommended does not violate any operator specific conditions. Such operator specific conditions can include, but are not limited to: traffic load, number of UEs connected on the target cell, frequency of handover between source and target cells, and so on.

The learning policy proposed herein is based on deep Reinforcement Learning (DRL), which is known to adapt well to rapidly changing environments when designed correctly for the targeted environment. DRL is also well-suited for environments where large sets of training data are not available and can be trained during the model interaction with the environment.

As provided herein, the disclosed embodiments reassociate only a single UE within a DRL based learning episode to avoid rapid changes in the environment and ensuring learning algorithm convergence. The graphical based relationship mapping within the graph neural networks (GNN) exploits the additional correlations in network behavior and refines the decision making of the DRL agent.

While some boosted trees implementation can provide the benefits of faster training and inference, the DRL based model utilized herein is capable of being trained on a larger variety of scenarios without requiring any synthetic data from a simulator or digital twin.

As compared to a UE-centric decision, the various embodiments provided herein can abstract the decision making at a higher level and can recommend policies at a cell-level in the form of source and target cell pairs as candidates to initiate a single UE handover in order to improve the network utility. The cell level decision making limits the action space to a finite dimension which improves learning process and convergence.

Figure 4:
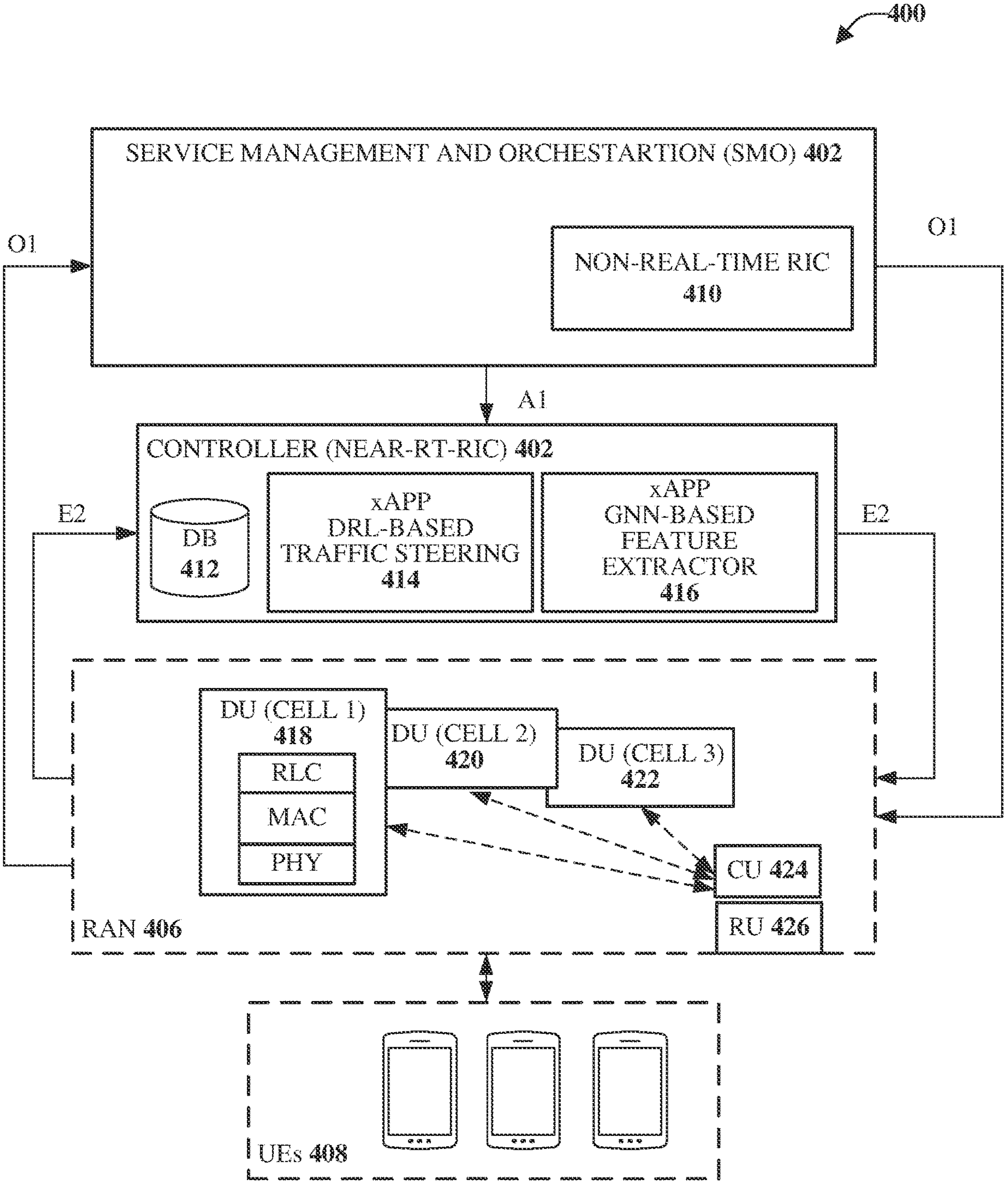
FIG. 4 illustrates an example, non-limiting, system architecture in accordance with one or more embodiments described herein.

FIG. 4 illustrates an example, non-limiting, system architecture 400 in accordance with one or more embodiments described herein. Repetitive description of like elements employed in other embodiments described herein is omitted for sake of brevity. The system architecture 400 can comprise one or more of the components and/or functionality of the process flow 300 and vice versa.

The system architecture 400 includes an SMO 402, a controller (Near-RT-RIC) 404, and a RAN 406. Also included in the system architecture 400 are one or more UEs 408 that communicate with the RAN 406 via one or more communication links. As illustrated, the RAN 406 and SMO 402 can communicate over an O1 interface. Further, the RAN 406 and controller (Near-RT-RIC) 404 can communicate over an E2 interface.

The SMO 402 can include a Non-Real-Time RIC 410. The SMO 402 can operate as the management and orchestration layer that controls configuration and automation aspects of RIC and RAN elements. The Non-Real-Time RIC 410 can be configured to retrain one or more ML models, deploy one or more ML models, and send A1 Policy updates to xApps, for example.

The controller (Near-RT-RIC) 404 can include a database 412 that can store various performance indicators (e.g., key performance indicators). The controller (Near-RT-RIC) 404 can include a GNN-Based Feature Extractor module 414, which can be implemented via a first xApp. The GNN-Based Feature Extractor module 414 can be responsible for extracting spatial features about the network state. Also included in the controller (Near-RT-RIC) 404 can be DRL-Based Traffic Steering module 416, which can be implemented as a second xApp. The DRL-Based Traffic Steering module 416 can be an RL agent responsible for nominating serving-target cell pair to perform handovers for a given number of UEs. The output of the GNN-Based Feature Extractor module is used by the DRL agent to perform traffic steering.

Further, the RAN 406 includes one or more cells, illustrated as a first DU 418 (cell 1), a second DU 420 (cell 2), and a third DU 422 (cell 3). Although illustrated as three cells (or 3 DUs) there can be more than three. The respective DUs (e.g., the first DU 418, the second DU 420, the third DU 422) can include respective layers illustrated in the first DU 418, for purposes of simplicity, as a Radio Link Control (RLC) layer, a Medium Access Control (MAC) layer, and a Physical (PHY) layer. The respective DUs communicate with a CU 424. Also included in the system architecture 400 is a Radio Unit (RU 426).

Figure 5:
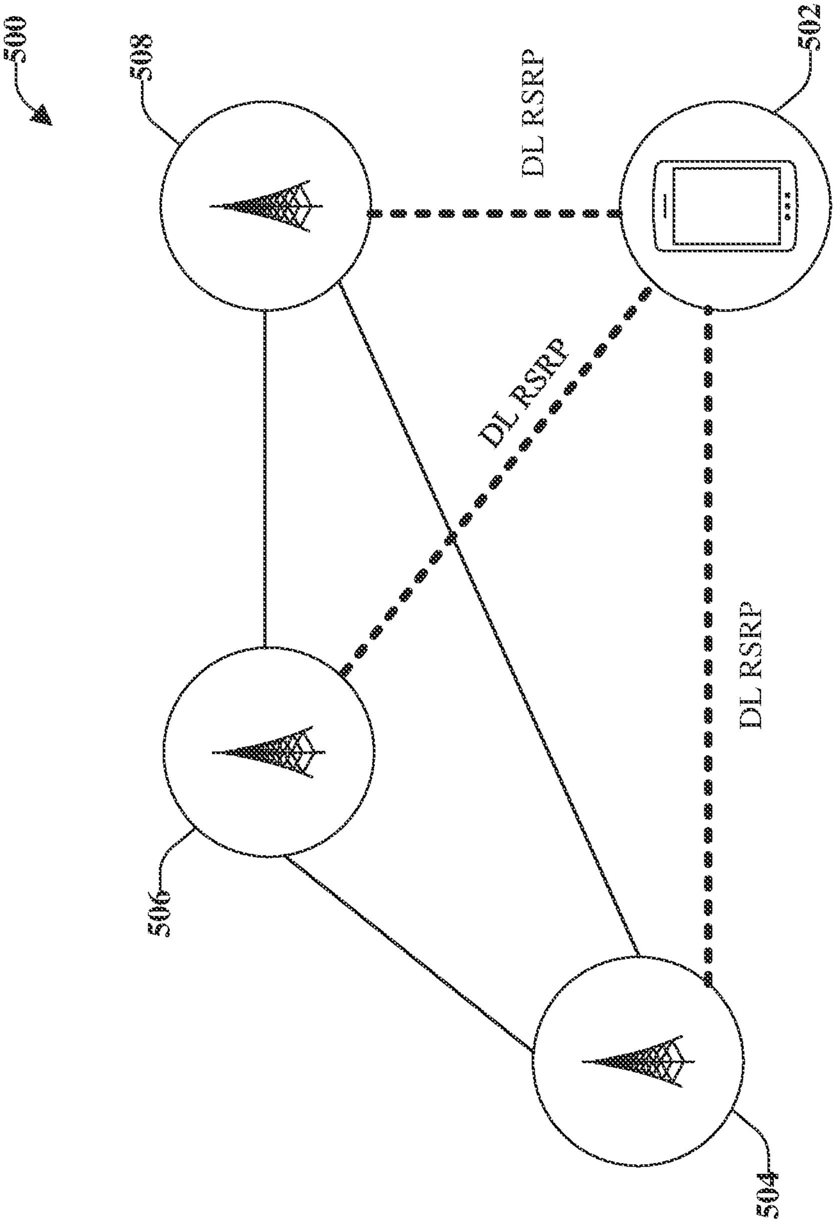
FIG. 5 illustrates an example, non-limiting, graph of an arbitrary cluster depicting cell-to-cell and cell-to-UE adjacency in accordance with one or more embodiments described herein.

FIG. 5 illustrates an example, non-limiting, graph 500 of an arbitrary cluster depicting cell-to-cell and cell-to-UE adjacency in accordance with one or more embodiments described herein. As illustrated, the graph 500 includes one or more nodes, depicted as a UE 502 and one or more base stations, illustrated as a first BS 504, a second BS 506, and a third BS 508. It is noted that more than one UE and more than three BSs can be included in a communication network.

Graph Neural networks are used with the disclosed embodiments to train models on the graphical representations of nodes and the associations between the nodes. This property can be useful for Traffic Steering given that existing processes do not consider the underlying neighborhood connections while deciding the ideal cell to handover UEs.

As mentioned, provided is a GNN-Based Feature Extractor module (that can also manifest as an xApp in the O-RAN framework) that pre-processes network spatial information (e.g., an arbitrary cell's association with nearby UEs and cells), and then derives an embedding for each node, where a node represents a cell or a UE, in a low-dimension space. It is noted that node embedding is a method that can be used to reduce the high dimensionality of the graph while capturing the information deemed to be the most important.

For the proposed Traffic Steering use case, node embedding is performed such that nodes that are associated together after being embedded will be closer together. The nodes associated together can be, for example, neighboring cells or a serving cell and connected UEs. Node embedding is performed in order to capture cell-to-cell and cell-to-UE adjacency and the input to the GNN may be pre-formatted as a Heterogenous Graph where nodes may represent cells or UEs. Further, node embedding is performed such that a given cell will be adjacent to its neighboring cells and UEs that see it as a serving or neighboring cell. Additionally, node embedding is performed such that the links between nodes of the graph shall be undirected and weighted. Further, node embedding is performed such that the input graph can be weighted to represent the strength of different links. For example, the weight of a cell-to-UE link can be the DL RSRP perceived by the UE. The input graph is also undirected since only the DL channel conditions are considered in cell-to-UE adjacency, while cell-to-cell adjacency only represents neighbor relations without other numerical weighting.

The resulting embeddings computed in the GNN-Based Feature Extractor xApp are passed on as enrichment information input to the DRL-Based TS xApp after preset time intervals.

Given the purpose of the GNN directed towards TS and the format of the input graph, the training flow of the GNN will now be discussed. For the task of node embedding, the training data can be collected from historical measurements collected from the network.

Using the data and the location information, the network is defined as an undirected and weighted graph. This graph can include, for example, UEs (location, features) in the network, Cells (location, features) in the network, Adjacency information denoting the connection weights between cells, Feature information such as cell load, channel quality, traffic characteristics, mobility data, handover statistics, KPI data etc., UEs perceived downlink (DL) reference signal received power (RSRP) from serving cell and neighboring cells (added as link weight), re-calculated after a preset period (configurable by the operator).

Such preset period can be set and/or configured by the operator, or can be configured automatically (e.g., dynamically) through machine learning or other computer-implemented techniques. For example, an urban network may enforce a shorter update time period relative to a rural area, since the urban network is more dynamic and, therefore, the algorithm (e.g., process) needs to adapt more often.

Subsequently, the GNN can be trained to encode the nodes onto a lower-dimension space. The loss function for the training process measures the dissimilarity between predicted and desired target embeddings. Within the network setting, the error could be smaller when there are nodes that are closer in the multi-dimensional heterogenous space. The result is a Neural Network trained on Graph-formatted input, which outputs spatial and channel condition aware node embeddings.

Figure 6:
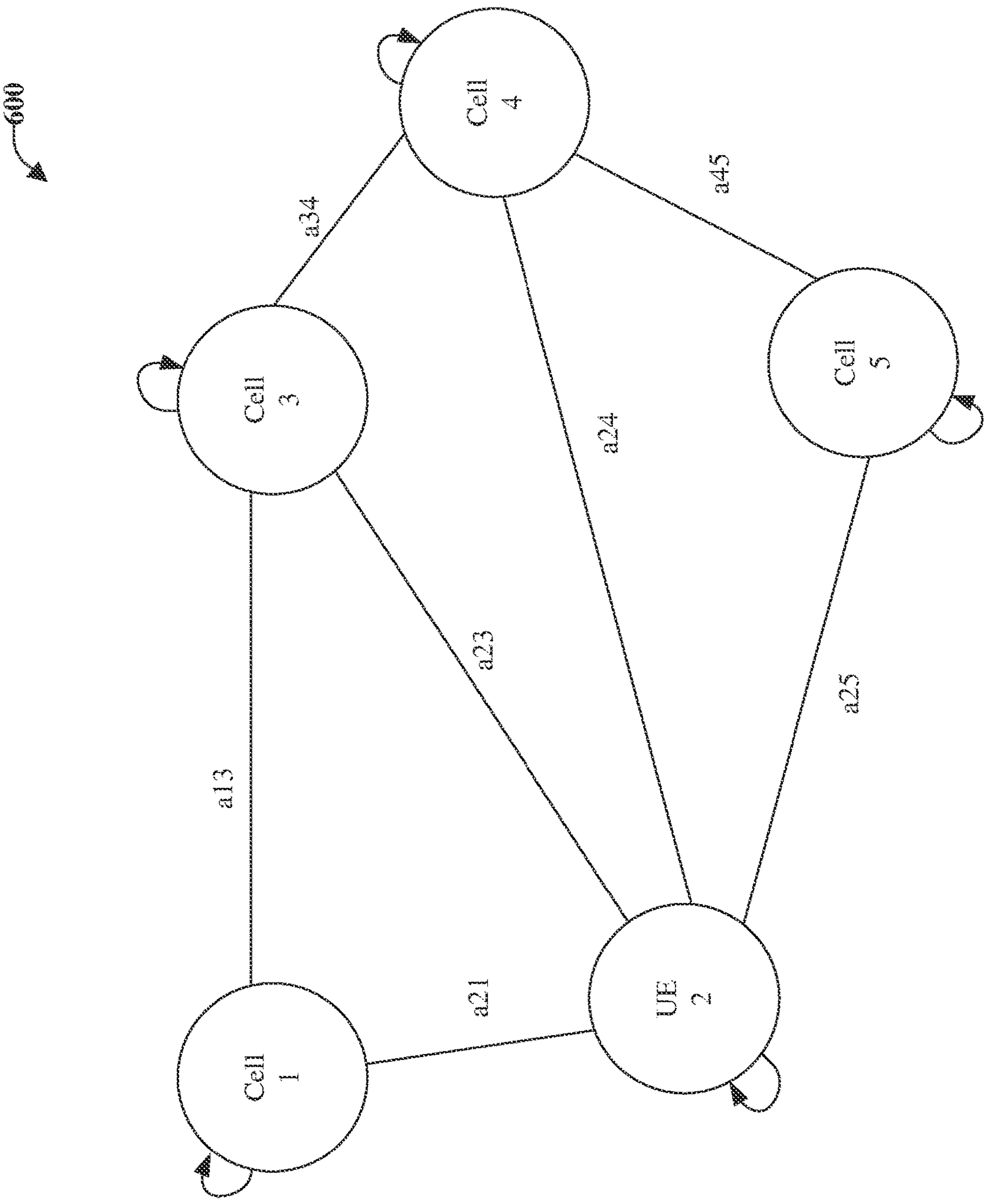
FIG. 6 illustrates an example, non-limiting, graph attention network architecture in accordance with one or more embodiments described herein.

FIG. 6 illustrates an example, non-limiting, graph attention networks (GAT) architecture 600 in accordance with one or more embodiments described herein. Given the aforementioned purpose of the GNN and the format of the input graph, Graph Attention Network (GAT) based architectures are proposed for utilizing GNNs.

GATs are networks that follow a spatial approach, which computes convolutions directly on the graph based on graph topology. GATs utilize attention layers (additive score, multi-head attention, etc.) to calculate the importance of each node. Since the importance of each node is based on the node representation and the aggregated representation of its neighbors, the GAT can generate node embeddings that reflect well the associations in the graph. In a GAT, the weights that are learned (e.g., on which a model is trained) are attention terms on links between connected nodes. In a use case, the weights for both cell-cell links as well as cell-UE links are considered.

As illustrated the GAT architecture 600 includes five nodes, illustrated as Cell 1, UE 2, Cell 3, Cell 4, and Cell 5. The links (e.g., adjacencies or edges) between the cells are labeled as follows: link a13 is between Cell 1 and Cell 3, link a34 is between Cell 3 and Cell 4, link a45 is between Cell 4 and Cell 5. The links between UE 2 and the cells are labeled as link A21 between UE 2 and Cell 1; link a23 between UE 2 and Cell 3; link a24 between UE 2 and Cell 4; and link a25 between UE 2 and Cell 5.

Figure 7:
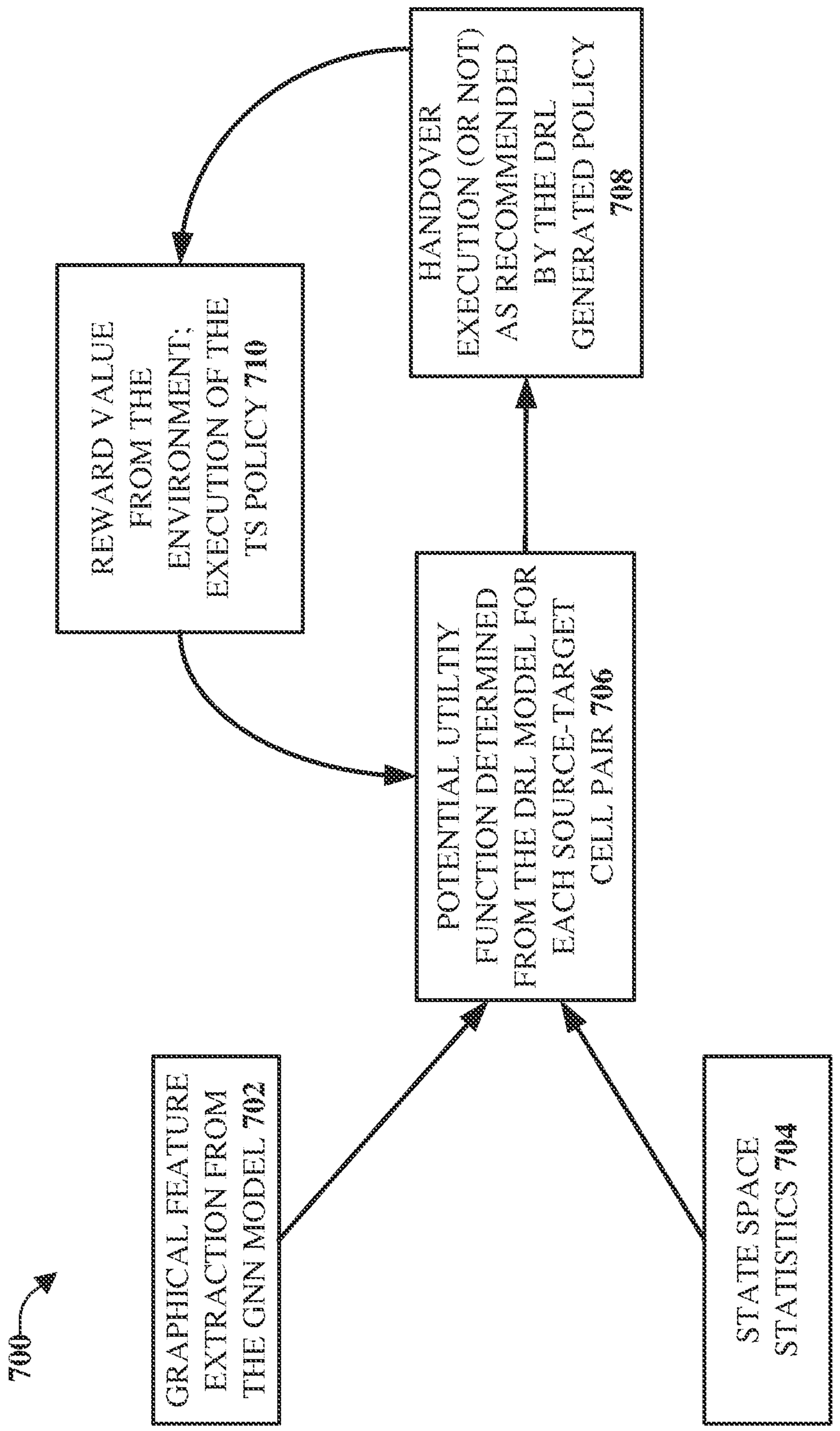
FIG. 7 illustrates an example, non-limiting, high-level flow diagram for deep reinforcement learning for utility function prediction and/or handover evaluation in accordance with one or more embodiments described herein.

FIG. 7 illustrates an example, non-limiting, high-level flow diagram 700 for deep reinforcement learning for utility function prediction and/or handover evaluation in accordance with one or more embodiments described herein. For each cell and its corresponding one-hop neighbors given from the spatial details embedded within the GNN, the output is obtained as a probability value from a DRL model that estimates the utility function change percentage (or the expected utility function value) if UE HO is performed from the given source-pair combination. The DRL model takes current state space statistics, as well as GNN generated features and/or predictions as input and generates expected utility function value if this UE HO transition is performed. The DRL model is based on a long short-term memory (LSTM) model to take use of the sequential data and use experience replay to improve its predictions performance.

The Action Space: The selected action is implemented for HO in the selected cell pair based on a criteria embedded within the RRC layer, which is simply if the HO does not violate any operator set thresholds, a UE is handed over from the source to target cell.

Reward Shaping: The reward is a function of the utility function (minimization problem discussed above) and proportional to the percentage change in utility function, such that an increase in utility function will yield positive values, and a decrease in utility function will yield negative values. The reward received at each time step is sent to the RL agent along with current state space and the GNN predictions to update the action from the DRL agent.

In further detail, graphic feature extraction from the GNN model is performed at 702. The extraction can include retrieved information, cell IDs, and so on. Further, state space statistics are determined, at 704. The state space statistics can include, but are not limited to: RSRP, RSRQ, CQI data, mobility and/or handover statistics, cell load statistics, UE QoS statistics, cluster utility function value, and so on. The graphical features and the state space statistics are used as inputs and, at 706, a potential utility function is computed from the DRL model for each source-target cell pair. Based on an output of the potential utility function, handover execution is performed (or is not performed) as recommended by the DRL generated policy, at 708. Further, as indicated at 710, a reward value from the environment followed by the execution of the proposed TS policy is applied and information can be fed back for a next time the potential utility function is determined at 706.

Figure 8:
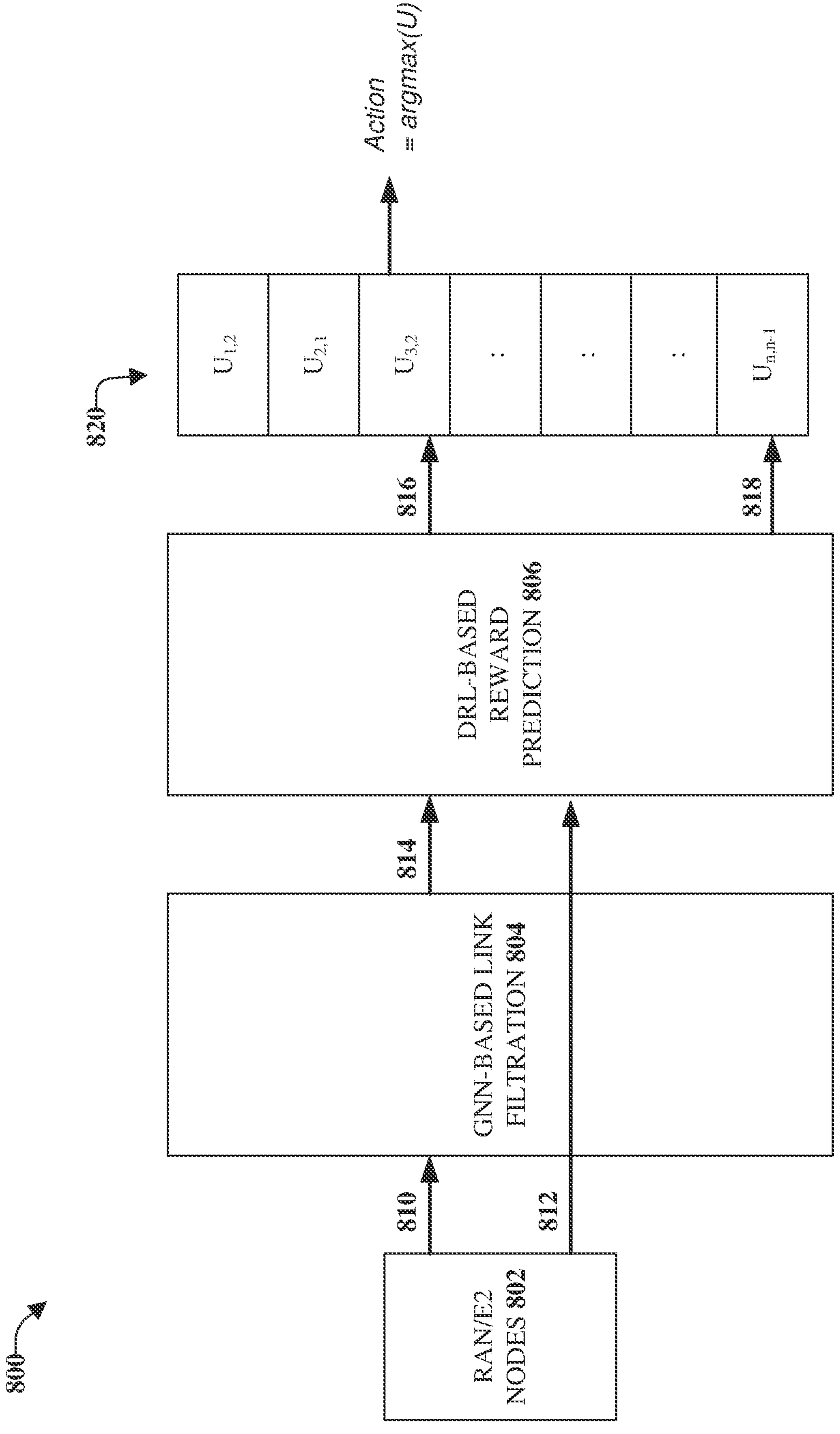
FIG. 8 illustrates an example, non-limiting, flow structure for graph neural network plus deep reinforcement learning based traffic steering in accordance with one or more embodiments described herein.

FIG. 8 illustrates an example, non-limiting, flow structure 800 for the GNN+ DRL based TS in accordance with one or more embodiments described herein. Illustrated are one or more RAN/E2 Nodes 802, a GNN-Based Link Filtration 804, and a DRL-Based Reward Function 806. As illustrated, information indicative of one or more network measurements 810 are received by the GNN-Based Link Filtration 804 from one or more RAN/E2 nodes 802. Further, information indicative of one or more network measurements 812 are received by the DRL-Based Reward Function 806 from one or more RAN/E2 nodes 802. Graph-Formatted Feature Information 814 is output from the GNN-Based Link Filtration 804 and used as input, along with information indicative of one or more network measurements 812 by the DRL-Based Reward Prediction 806. An output of the DRL-Based Reward Prediction 806 can be a utility gain per BS pair 816 and a potential handover nomination 818. An action 820 is output as a result of the models.

The output at 820 includes a utility gain per BS-UE pair. For example, a first utility gain for a handover from BS 1 to BS 2 (U1,2) is output. A second utility gain for a handover from BS 2 to BS 1 (U2,1) is output. A third utility gain for a handover from BS 3 to BS 2 (U3,2) is output, and so on. The action selected is the maximum utility gain selected from the group of utility gains.

After the selection of the action as given in FIG. 8, the reward for the action is calculated based on the true improvement in the utility function of the cell cluster. FIG. 9 illustrates a mathematical representation of a reward function 900 for time instance 't' in accordance with one or more embodiments described herein.

Figure 10:
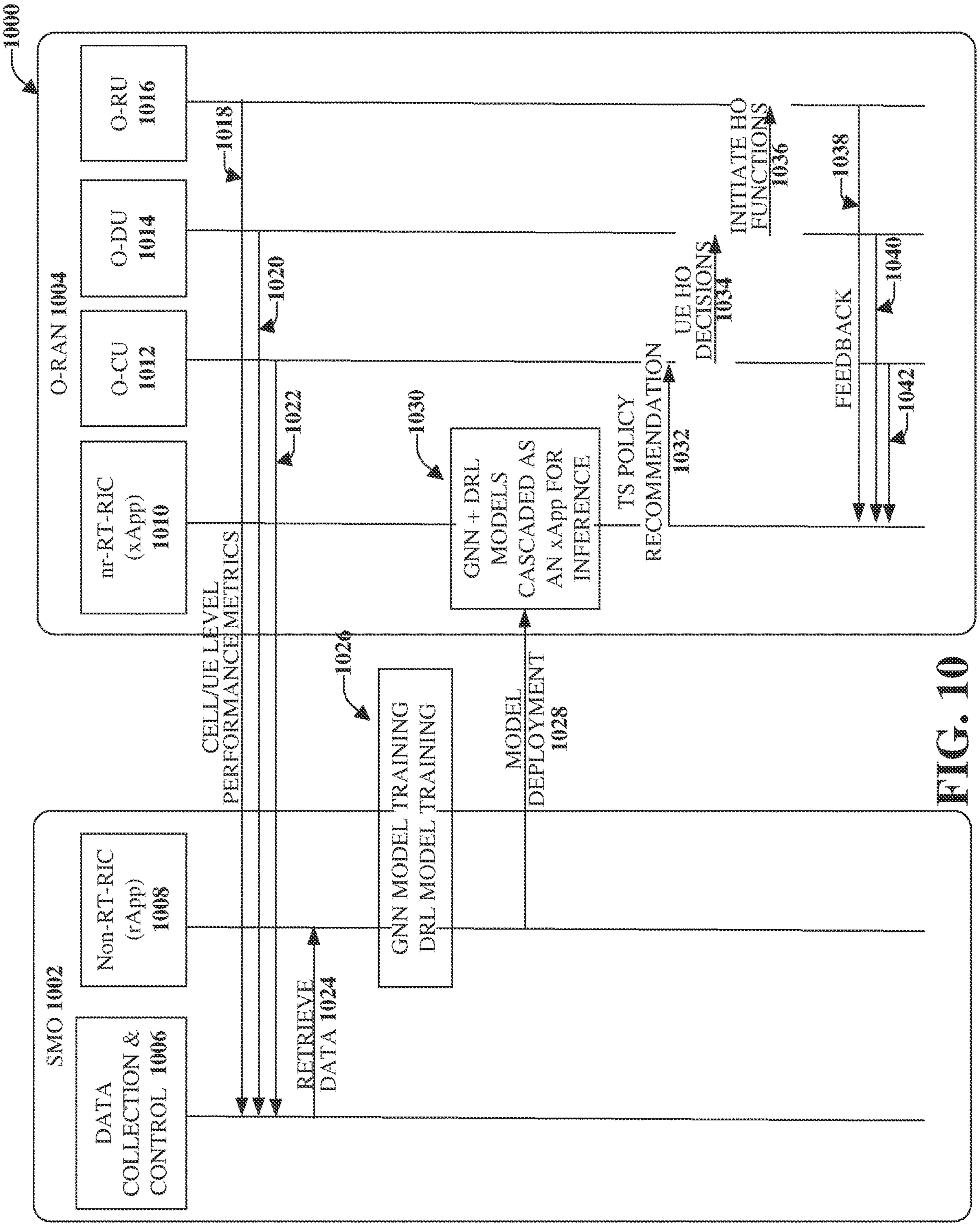
FIG. 10 illustrates an example, non-limiting, message sequence flow chart that can facilitate dynamic network traffic steering using artificial intelligence in accordance with one or more embodiments described herein.

FIG. 10 illustrates an example, non-limiting, message sequence flow chart 1000 that can facilitate dynamic network traffic steering using artificial intelligence in accordance with one or more embodiments described herein. The message sequence flow chart 1000 can be utilized for new radio, 5G, beyond 5G, and/or other advanced communication protocols, as discussed herein.

In the illustrated embodiment of FIG. 10, the proposed framework can be implemented as a disaggregated framework such as Open RAN (O-RAN). As illustrated, the message sequence flow chart 1000 represents the message sequence between network equipment including a Service Management and Orchestration (SMO 1002) and an O-RAN 1004. The SMO 1002 includes a data collection and control component (DCC 1006) and a non-Real-Time-RIC (non-RT-RIC 1008), which can be implemented as an rApp according to an implementation. The O-RAN 1004 includes a near-Real-Time-RIC (nr-RT-RIC 1010), which can be implemented as an xApp according to an implementation. The O-RAN 1004 can also include an Open RAN control unit (O-CU 1012), an Open RAN distributed unit (O-DU 1014), and an Open RAN radio unit (O-RU 1016).

As mentioned, the proposed framework can be implemented as a disaggregated framework such as Open RAN (O-RAN) based network architecture where the model is trained in the non-RT-RIC 1008) using UE and/or BS location data, neighborhood adjacency information, UE channel statistics with serving and neighbor cells, HO statistics, cell load statistics and UE KPI values. The trained model is deployed at the near-RT-RIC (nr-RT-RIC 1010) as an xApp where it is used for inference. Once the model performance is deteriorating, it can be retrained using recent data in the non-RT-RIC 1018 and redeployed in the nr-RT-RIC 1010.

With continuing reference to FIG. 10, the DCC 1006 receives information indicative of cell and/or UE level performance metrics, which can include neighborhood data (e.g., information indicative of respective measurements of nearby nodes). As illustrated, this information exchange occurs where the O-RU 1016, the O-DU 1014, and the O-CU 1012, send information (indicated at 1018, 1020, and 1022, respectively) to the DCC 1006.

As indicated at 1024, the non-RT-RIC 1008 retrieves data from the DCC 906. At 1026 GNN model training and DRL model training is performed, as discussed herein. The models are deployed at 1028. Further, the GNN+ DRL models are cascaded, at 1030, as an xApp for inference.

A TS policy recommendation is sent from the nr-RT-RIC 1010 to the O-CU 1012, as indicated at 1032. UE HO decisions are sent from the O-CU 1012 to the O-DU 1014, at 1034. Further, at 1036, HO functions are initiated. Upon or after the HO functions are initiated, information exchange can occur between the O-RU 1016, the O-DU 1014, the O-CU 1012, and the nr-RT-RIC 1010, as indicated at 1042, 1044, and 1046. This information exchange can include feedback with the latest cell and/or UE level performance metrics.

Figure 11:
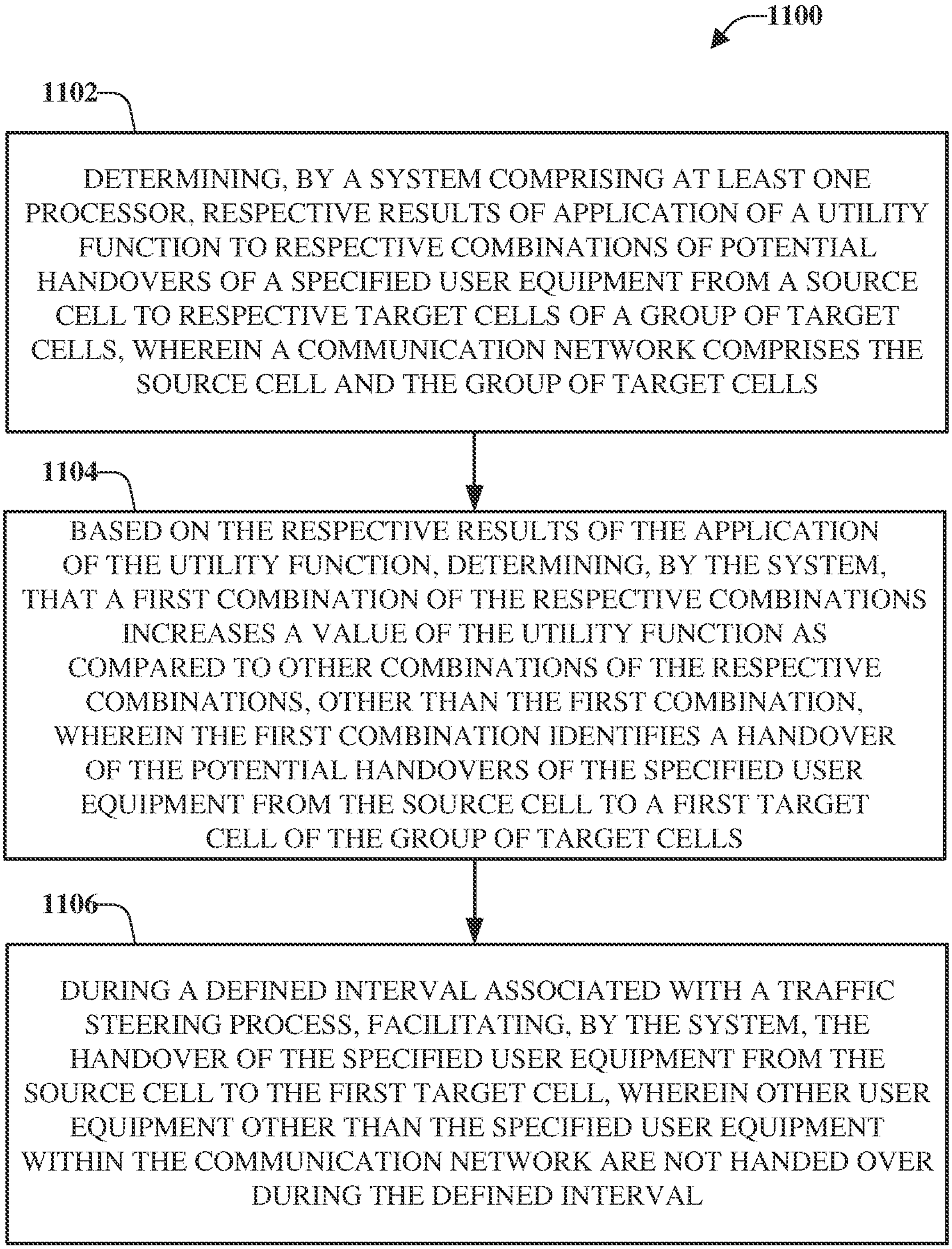
FIG. 11 illustrates a flow diagram of an example, non-limiting, computer-implemented method that facilitates traffic steering in advanced communication networks in accordance with one or more embodiments described herein.

FIG. 11 illustrates a flow diagram of an example, non-limiting, computer-implemented method 1100 that facilitates traffic steering in advanced communication networks in accordance with one or more embodiments described herein. The computer-implemented method 1100 and/or other methods discussed herein can be implemented by a system comprising a processor and a memory. In an example, the system can be implemented by a network equipment of a disaggregated network architecture. It is noted that the embodiment of FIG. 11 is discussed with respect to being deployed within an O-RAN framework, however, the disclosed embodiments are not limited to an O-RAN framework.

The computer-implemented method 1100 begins, at 1104 with determining, by a system comprising at least one processor, respective results of application of a utility function to respective combinations of potential handovers of a specified user equipment from a source cell to respective target cells of a group of target cells. The communication network includes the source cell and the group of target cells.

The utility function is based on an optimization function that facilitates a tradeoff between user equipment quality of service, an energy consumption of the communication network, and an amount of handovers for the specified user equipment during a defined time period. In an example, the user equipment quality of service can be defined for respective user equipment classes of user equipment within the communication network.

For example, at 1102, a first result of the utility function is determined for a first combination that includes the specified UE and a first target cell. Further, a second result (or subsequent result) of the utility function is determined for second combination (or subsequent combination) that includes the specified UE and a second target cell (or a subsequent target cell, and so on. This process continues until results of the utility function for the specified UE and all target cells are determined.

At 1104, based on the respective results of the application of the utility function, the computer-implemented method 1100 includes determining, by the system, that a first combination of the respective combinations increases a value of the utility function as compared to other combinations of the respective combinations, other than the first combination. The first combination identifies a handover of the potential handovers of the specified user equipment from the source cell to a first target cell of the group of target cells.

During a defined interval associated with a traffic steering process, the computer-implemented method 1100 includes facilitating, by the system, the handover of the specified user equipment from the source cell to the first target cell, at 1106. The other user equipment other than the specified user equipment within the communication network are not handed over during the defined interval. By not handing over other user equipment at a same time or at substantially a same time, can mitigate the occurrence of rapid changes in the environment and can help ensure model learning convergence.

In some implementations, determining of the respective results of the application of the utility function can include determining a first result of application of the utility function to the specified user equipment and the first target cell and determining a second result of application of the utility function to the specified user equipment and a second target cell of the group of target cells. The first result includes a first increase to the utility function and the second result includes a second increase to the utility function. However, it is noted that one of the results could result in a decrease in the utility function. Further to this implementation, the computer-implemented method can include, based on the first increase being determined to be a larger increase than the second increase, selecting the first target cell as the first target cell.

The computer-implemented method 1100 can include, according to some implementations, prior to the determining of the respective results of the application of the utility function and based on a graph attention network process, training, by the system, a first model to a first defined confidence level. Further, based on a deep reinforcement learning process, the computer-implemented method can include training, by the system, a second model to a second defined confidence level. Training the second model can include, sending, by the system, information indicative of a change value to the utility function in case of a UE handover from a source to target cell pair (e.g., for every target cell, there is a corresponding source-to-target cell pair). Further, training the second model can include applying, by the system, a reward to the second model based on a reward function.

Further to the above implementations, applying the reward can include, based on a first determination that the handover resulted in a positive change to the utility function, applying a positive reward to the second model. Alternatively, applying the reward can include, based on a second determination that the handover resulted in a negative change to the utility function, applying a penalty to the second model.

In some implementations, determining of the respective results of the application of the utility function can be based on a recurrent neural network based graph neural network model and determining that the first combination of the respective combinations increases the value of the utility function is based on a reinforcement learning model. The reinforcement learning model can employ a deep reinforcement learning model. In some implementations, the recurrent neural network based graph neural network model and the reinforcement learning model are implemented as respective network automation tools.

It should be noted that terms such as "real-time," "near real-time," "dynamically," "instantaneous," "continuously," and the like can refer to data which is collected and processed at an order without perceivable delay for a given context, the timeliness of data or information that has been delayed only by the time required for electronic communication, actual or near actual time during which a process or event occur, and temporally present conditions as measured by real-time software, real-time systems, and/or high-performance computing systems. Real-time software and/or performance can be employed via synchronous or non-synchronous programming languages, real-time operating systems, and real-time networks, each of which provide frameworks on which to build a real-time software application. A real-time system may be one where its application can be considered (within context) to be a main priority. In a real-time process, the analyzed (input) and generated (output) samples can be processed (or generated) continuously at the same time (or near the same time) it takes to input and output the same set of samples independent of any processing delay.

Example, non-limiting Non-Real Time RAN Intelligent Controller (Non-RT RIC) functions include service and policy management, RAN analytics, and model training for the near-Real Time RICs. In this regard, the Non-RT-RIC enables non-real-time (e.g., a first range of time, such as >1 second) control of RAN elements and their resources through applications, e.g., specialized applications called rApps. Example, non-limiting Near-Real Time RAN Intelligent Controller (Near-RT RIC) functions enable near-real-time optimization and control and data monitoring of O-CU and O-DU nodes in near-RT timescales (e.g., a second range of time representing less time than the first time range, such as between 10 milliseconds and 1 second). In this regard, the Near-RT RIC controls RAN elements and their resources with optimization actions that typically take about 10 milliseconds to about one second to complete, although different time ranges can be selected. The Near-RT RIC can receive policy guidance from the Non-RT-RIC and can provide policy feedback to the Non-RT-RIC through specialized applications called xApps. In this regard, a Real Time RAN Intelligent Controller (RT RIC) is designed to handle network functions at real time timescales (e.g., a third range of time representing less time than the first time range and the second time range, such as <10 milliseconds).

Methods that can be implemented in accordance with the disclosed subject matter will be better appreciated with reference to the flow charts provided herein. While, for purposes of simplicity of explanation, the methods are shown and described as a series of flows and/or blocks, it is to be understood and appreciated that the disclosed aspects are not limited by the number or order of flows and/or blocks, as some flows and/or blocks can occur in different orders and/or at substantially the same time with other blocks from what is depicted and described herein. Moreover, not all illustrated flows and/or blocks are required to implement the disclosed methods. It is to be appreciated that the functionality associated with the flows and/or blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Aspects of systems, devices, apparatuses, and/or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the system can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As used herein, the term "storage device," "first storage device," "second storage device," "storage cluster nodes," "storage system," and the like (e.g., node device), can include, for example, private or public cloud computing systems for storing data as well as systems for storing data comprising virtual infrastructure and those not comprising virtual infrastructure. The term "I/O request" (or simply "I/O") can refer to a request to read and/or write data.

The term "cloud" as used herein can refer to a cluster of nodes (e.g., set of network servers), for example, within an object storage system, which are communicatively and/or operatively coupled to one another, and that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with one another to provide resources for end-users.

Further, the term "storage device" can refer to any Non-Volatile Memory (NVM) device, including Hard Disk Drives (HDDs), flash devices (e.g., NAND flash devices), and next generation NVM devices, any of which can be accessed locally and/or remotely (e.g., via a Storage Attached Network (SAN)). In some embodiments, the term "storage device" can also refer to a storage array comprising one or more storage devices. In various embodiments, the term "object" refers to an arbitrary-sized collection of user data that can be stored across one or more storage devices and accessed using I/O requests.

Further, a storage cluster can include one or more storage devices. For example, a storage system can include one or more clients in communication with a storage cluster via a network. The network can include various types of communication networks or combinations thereof including, but not limited to, networks using protocols such as Ethernet, Internet Small Computer System Interface (iSCSI), Fibre Channel (FC), and/or wireless protocols. The clients can include user applications, application servers, data management tools, and/or testing systems.

As utilized herein an "entity," "client," "user," and/or "application" can refer to any system or person that can send I/O requests to a storage system. For example, an entity, can be one or more computers, the Internet, one or more systems, one or more commercial enterprises, one or more computers, one or more computer programs, one or more machines, machinery, one or more actors, one or more users, one or more customers, one or more humans, and so forth, hereinafter referred to as an entity or entities depending on the context.

Figure 12:
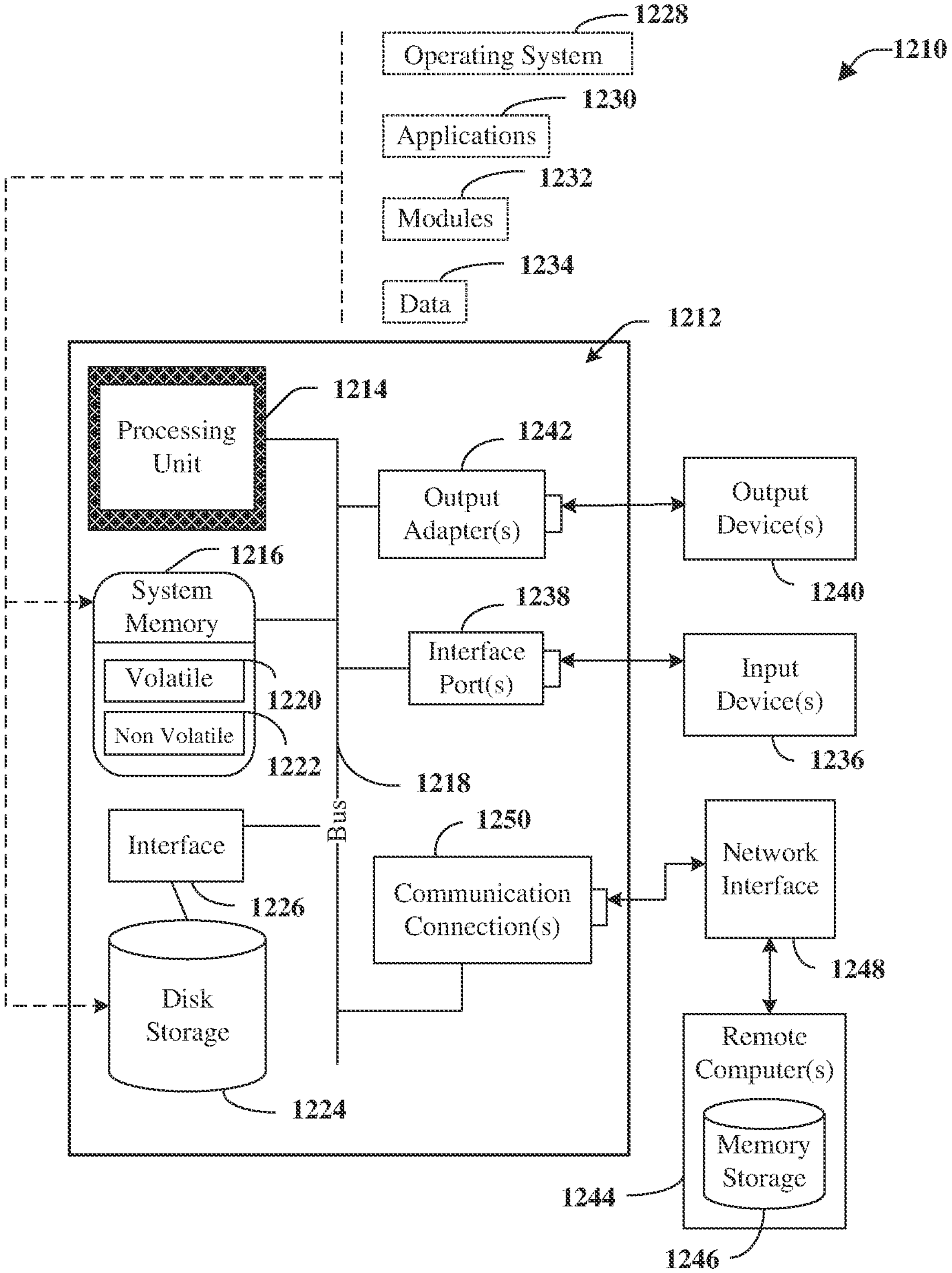
FIG. 12 illustrates an example, non-limiting, computing environment in which one or more embodiments described herein can be facilitated.

In order to provide a context for the various aspects of the disclosed subject matter, FIG. 12 as well as the following discussion are intended to provide a brief, general description of a suitable environment in which the various aspects of the disclosed subject matter can be implemented.

With reference to FIG. 12, an example environment 1210 for implementing various aspects of the aforementioned subject matter comprises a computer 1212. The computer 1212 comprises a processing unit 1214, a system memory 1216, and a system bus 1218. The system bus 1218 couples system components including, but not limited to, the system memory 1216 to the processing unit 1214. The processing unit 1214 can be any of various available processors. Multi-core microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1216 comprises volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can comprise read only memory (ROM), programmable ROM (PROM), electrically programmable ROM (EPROM), electrically erasable PROM (EEPROM), or flash memory. Volatile memory 1220 comprises random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1212 also comprises removable/non-removable, volatile/non-volatile computer storage media. FIG. 12 illustrates, for example a disk storage 1224. Disk storage 1224 comprises, but is not limited to, devices like a magnetic disk drive, floppy disk drive, tape drive, Jaz drive, Zip drive, LS-100 drive, flash memory card, or memory stick. In addition, disk storage 1224 can comprise storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1224 to the system bus 1218, a removable or non-removable interface is typically used such as interface 1226.

It is to be appreciated that FIG. 12 describes software that acts as an intermediary between users and the basic computer resources described in suitable operating environment 1210. Such software comprises an operating system 1228. Operating system 1228, which can be stored on disk storage 1224, acts to control and allocate resources of the computer 1212. System applications 1230 take advantage of the management of resources by operating system 1228 through program modules 1232 and program data 1234 stored either in system memory 1216 or on disk storage 1224. It is to be appreciated that one or more embodiments of the subject disclosure can be implemented with various operating systems or combinations of operating systems.

A user enters commands or information into the computer 1212 through input device(s) 1236. Input devices 1236 comprise, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 comprise, for example, a serial port, a parallel port, a game port, and a universal serial bus (USB). Output device(s) 1240 use some of the same type of ports as input device(s) 1236. Thus, for example, a USB port can be used to provide input to computer 1212, and to output information from computer 1212 to an output device 1240. Output adapters 1242 are provided to illustrate that there are some output devices 1240 like monitors, speakers, and printers, among other output devices 1240, which require special adapters. The output adapters 1242 comprise, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically comprises many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses communication networks such as local-area networks (LAN) and wide-area networks (WAN). LAN technologies comprise Fiber Distributed Data Interface (FDDI), Copper Distributed Data Interface (CDDI), Ethernet/IEEE 802.3, Token Ring/IEEE 802.5, and the like. WAN technologies comprise, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the system bus 1218. While communication connection 1250 is shown for illustrative clarity inside computer 1212, it can also be external to computer 1212. The hardware/software necessary for connection to the network interface 1248 comprises, for exemplary purposes only, internal and external technologies such as, modems including regular telephone grade modems, cable modems and DSL modems, ISDN adapters, and Ethernet cards.

Figure 13:
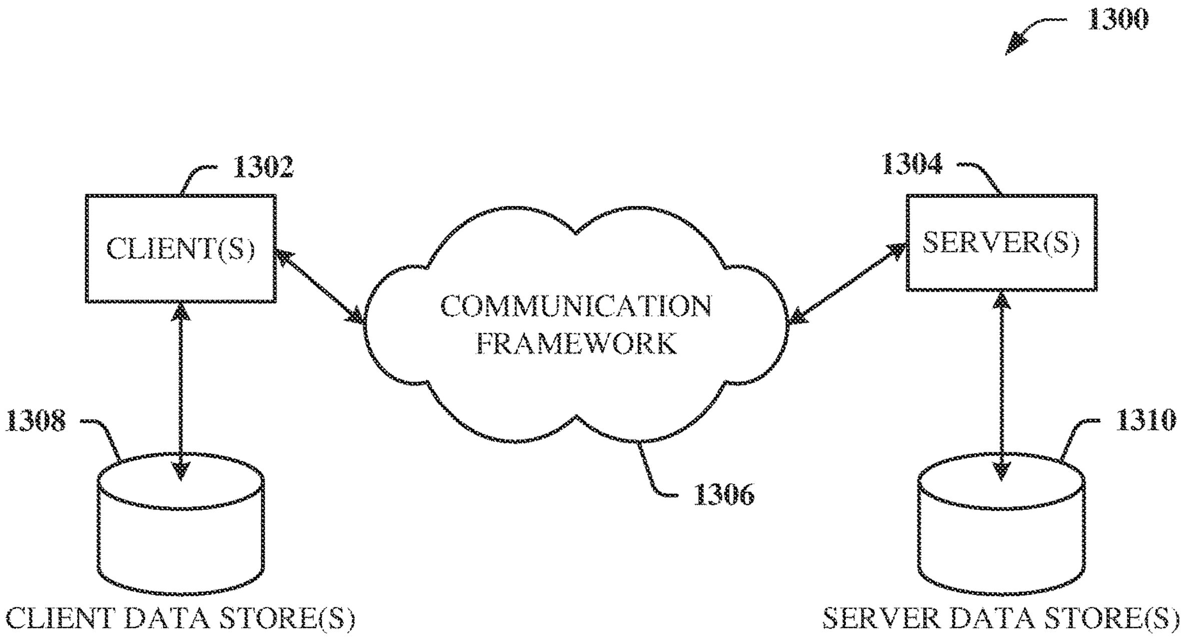
FIG. 13 illustrates an example, non-limiting, networking environment in which one or more embodiments described herein can be facilitated.

FIG. 13 is a schematic block diagram of a sample computing environment 1300 with which the disclosed subject matter can interact. The sample computing environment 1300 includes one or more client(s) 1302. The client(s) 1302 can be hardware and/or software (e.g., threads, processes, computing devices). The sample computing environment 1300 also includes one or more server(s) 1304. The server(s) 1304 can also be hardware and/or software (e.g., threads, processes, computing devices). The servers 1304 can house threads to perform transformations by employing one or more embodiments as described herein, for example. One possible communication between a client 1302 and servers 1304 can be in the form of a data packet adapted to be transmitted between two or more computer processes. The sample computing environment 1300 includes a communication framework 1306 that can be employed to facilitate communications between the client(s) 1302 and the server(s) 1304. The client(s) 1302 are operably connected to one or more client data store(s) 1308 that can be employed to store information local to the client(s) 1302. Similarly, the server(s) 1304 are operably connected to one or more server data store(s) 1310 that can be employed to store information local to the servers 1304.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," "manager," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. Yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable storage media can comprise, but are not limited to, radon access memory (RAM), read only memory (ROM), electrically erasable programmable read only memory (EEPROM), flash memory or other memory technology, solid state drive (SSD) or other solid-state storage technology, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

Disclosed embodiments and/or aspects should neither be presumed to be exclusive of other disclosed embodiments and/or aspects, nor should a device and/or structure be presumed to be exclusive to its depicted element in an example embodiment or embodiments of this disclosure, unless where clear from context to the contrary. The scope of the disclosure is generally intended to encompass modifications of depicted embodiments with additions from other depicted embodiments, where suitable, interoperability among or between depicted embodiments, where suitable, as well as addition of a component(s) from one embodiment(s) within another or subtraction of a component(s) from any depicted embodiment, where suitable, aggregation of elements (or embodiments) into a single device achieving aggregate functionality, where suitable, or distribution of functionality of a single device into multiple device, where suitable. In addition, incorporation, combination or modification of devices or elements (e.g., components) depicted herein or modified as stated above with devices, structures, or subsets thereof not explicitly depicted herein but known in the art or made evident to one with ordinary skill in the art through the context disclosed herein are also considered within the scope of the present disclosure.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGS., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

determining, by a system comprising at least one processor, respective results of application of a utility function to respective combinations of potential handovers of a specified user equipment from a source cell to respective target cells of a group of target cells, wherein a communication network comprises the source cell and the group of target cells;

based on the respective results of the application of the utility function, determining, by the system, that a first combination of the respective combinations increases a value of the utility function as compared to other combinations of the respective combinations, other than the first combination, wherein the first combination identifies a handover of the potential handovers of the specified user equipment from the source cell to a first target cell of the group of target cells; and during a defined interval associated with a traffic steering process, facilitating, by the system, the handover of the specified user equipment from the source cell to the first target cell, wherein other user equipment other than the specified user equipment within the communication network are not handed over during the defined interval.

2. The method of claim 1, wherein the determining of the respective results of the application of the utility function comprises:

determining a first result of application of the utility function to the specified user equipment and the first target cell, wherein the first result comprises a first increase to the utility function;

determining a second result of application of the utility function to the specified user equipment and a second target cell of the group of target cells, wherein the second result comprises a second increase to the utility function; and based on the first increase being determined to be a larger increase than the second increase, selecting the first target cell as the first target cell.

3. The method of claim 1, further comprising:

prior to the determining of the respective results of the application of the utility function and based on a graph attention network process, training, by the system, a first model to a first defined confidence level; and based on a deep reinforcement learning process, training, by the system, a second model to a second defined confidence level.

4. The method of claim 3, wherein the training of the second model comprises:

sending, by the system, information indicative of a change value to the utility function in case of a user equipment handover from a source to target cell pair; and applying, by the system, a reward to the second model based on a reward function.

5. The method of claim 4, wherein the applying comprises:

based on a first determination that the handover resulted in a positive change to the utility function, applying a positive reward to the second model; or based on a second determination that the handover resulted in a negative change to the utility function, applying a penalty to the second model.

6. The method of claim 1, wherein the utility function is based on an optimization function that facilitates a tradeoff between user equipment quality of service, an energy consumption of the communication network, and an amount of handovers for the specified user equipment during a defined time period.

7. The method of claim 6, wherein the user equipment quality of service is defined for respective user equipment classes of user equipment within the communication network.

8. The method of claim 1, wherein the determining of the respective results of the application of the utility function is based on a recurrent neural network based graph neural network model and the determining that the first combination of the respective combinations increases the value of the utility function is based on a reinforcement learning model.

9. The method of claim 8, wherein the recurrent neural network based graph neural network model employs a graph neural network model, and wherein the reinforcement learning model employs a deep reinforcement learning model.

10. The method of claim 8, wherein the recurrent neural network based graph neural network model and the reinforcement learning model are implemented as respective network automation tools.

11. The method of claim 1, wherein the communication network is deployed as a disaggregated architecture that comprises central units, distributed units, and a near-real-time-radio access network intelligent controller.

12. The method of claim 1, wherein the group of target cells is configured to operate according to a new radio network communication protocol.

13. A system, comprising:

a processor; and a memory that stores executable instructions that, when executed by the processor, facilitate performance of operations, comprising:

based on respective results of application of a utility function to respective combinations of potential handovers of a specified user equipment from a source cell to respective target cells of a group of target cells, determining that a first combination of the respective combinations results in an increase in the utility function as compared to other combinations of the respective combinations, other than the first combination, wherein the first combination identifies a handover of the potential handovers of the specified user equipment from the source cell to a target cell of the group of target cells; and during a defined interval, causing the handover of the specified user equipment from the source cell to the target cell, wherein other user equipment are not handed over during the defined interval.

14. The system of claim 13, the operations can include:

prior to the determining of the respective results of the application of the utility function and based on a graph attention network process, training a first model to a first defined confidence level; and based on a deep reinforcement learning process, training a second model to a second defined confidence level.

15. The system of claim 14, wherein the first model is a graph neural network model, and wherein the second model is a deep reinforcement learning model.

16. The system of claim 13, wherein the utility function is based on an optimization function that facilitates a tradeoff between user equipment quality of service, an energy consumption of a communication network, and a quantity of previous handovers of the specified user equipment during a defined time period.

17. The system of claim 16, wherein the user equipment quality of service is defined for respective user equipment classes of user equipment within the communication network.

18. The system of claim 13, wherein the group of target cells is configured to operate according to a fifth generation network communication protocol.

19. A non-transitory machine-readable medium, comprising executable instructions that, when executed by a processor of network equipment, facilitate performance of operations, wherein the operations comprise:

determining respective results of application of a utility function to respective combinations of potential transfers of a specified user equipment from being connect to a source cell to being connected to respective target cells of a group of target cells, wherein a communication network comprises the source cell and the group of target cells;

based on the respective results of the application of the utility function, determining that a first combination of the respective combinations causes an increase to the utility function as compared to other combinations of the respective combinations, other than the first combination, wherein the first combination identifies a transfer of the potential transfers of the specified user equipment from the source cell to a target cell of the group of target cells; and during a defined interval associated with a traffic steering process, implementing a network traffic steering process that transfers the specified user equipment from being connect to the source cell to being connect to the target cell, wherein other user equipment other than the specified user equipment within the communication network are not moved between cells during the defined interval.

20. The non-transitory machine-readable medium of claim 19, wherein the utility function is based on an optimization function that facilitates a tradeoff between user equipment quality of service, an energy consumption of the communication network, and a number of transfers of the specified user equipment within a defined time period, and wherein the user equipment quality of service is defined for respective user equipment classes of user equipment within the communication network.

* * * * *